(12) United States Patent
Eryilki et al.

(10) Patent No.: US 11,499,429 B2
(45) Date of Patent: Nov. 15, 2022

(54) ROTOR BLADE OF A TURBOMACHINE

(71) Applicant: Rolls-Royce Deutschland Ltd & Co KG, Blankenfelde-Mahlow (DE)

(72) Inventors: Cetin Eryilki, Teltow (DE); Erik Johann, Berlin (DE)

(73) Assignee: ROLLS-ROYCE DEUTSCHLAND LTD & CO KG, Blankenfelde Mahlow (DE)

( * ) Notice: Subject to any disclaimer, the term of this patent is extended or adjusted under 35 U.S.C. 154(b) by 173 days.

(21) Appl. No.: 16/832,506

(22) Filed: Mar. 27, 2020

(65) Prior Publication Data

US 2020/0308968 A1 Oct. 1, 2020

(30) Foreign Application Priority Data

Mar. 27, 2019 (DE) .................... 10 2019 107 839.3

(51) Int. Cl.
*F01D 5/14* (2006.01)
*F01D 5/16* (2006.01)
*F04D 29/32* (2006.01)

(52) U.S. Cl.
CPC ............... *F01D 5/141* (2013.01); *F01D 5/16* (2013.01); *F04D 29/324* (2013.01);
(Continued)

(58) Field of Classification Search
CPC ........ F01D 5/141; F01D 5/16; F05D 2220/36; F05D 2250/71; F05D 2250/713; F05D 2250/90; F05D 2240/303; F05D 2240/304
See application file for complete search history.

(56) References Cited

U.S. PATENT DOCUMENTS 6,328,533 B1 * 12/2001 Decker .................. F01D 5/141
                                                 416/228
7,108,486 B2 * 9/2006 Talbotec ............... F04D 29/324
                                                 416/243
(Continued)

FOREIGN PATENT DOCUMENTS

DE           69721114 T2     2/2004
EP            1111188 A2     6/2001
(Continued)

OTHER PUBLICATIONS

German Search Report dated Feb. 2, 2020 for counterpart German Patent Application No. 10 2019 107 839.3.
(Continued)

*Primary Examiner* — Brian P Wolcott
(74) *Attorney, Agent, or Firm* — Shuttleworth & Ingersoll, PLC; Timothy J. Klima

(57) ABSTRACT

A rotor blade airfoil of a turbomachine, which rotor blade airfoil has: a leading edge, a trailing edge, and a profile chord length which is dependent on the height of the blade airfoil. In a side view of the blade airfoil, a maximum projected chord length his defined as the axial spacing between the axially foremost point of the leading edge and the axially rearmost point of the trailing edge of the blade airfoil in the side view under consideration. Here, the axial position of the leading edge varies in a manner dependent on the height of the blade airfoil above a front axial region. Provision is made whereby, furthermore, with respect to the side view under consideration, the axial position of the trailing edge of the blade airfoil varies in a manner dependent on the height of the blade airfoil above a rear axial region, wherein the variation of the axial position of the trailing edge in the rear axial region amounts to at least 10% of the maximum projected chord length, the trailing edge of the blade airfoil assumes the axially rearmost point at a (Continued)

height of the blade airfoil that lies in the range between 20% and 50% of the total height of the blade airfoil at the trailing edge, and the leading edge of the blade airfoil assumes the axially foremost point at a height of the blade airfoil that lies in the range between 15% and 35% of the total height of the blade airfoil at the leading edge.

20 Claims, 9 Drawing Sheets

(52) U.S. Cl.
CPC .... *F05D 2220/323* (2013.01); *F05D 2220/36* (2013.01); *F05D 2240/303* (2013.01); *F05D 2240/304* (2013.01); *F05D 2250/713* (2013.01); *F05D 2250/90* (2013.01)

(56) References Cited

U.S. PATENT DOCUMENTS

| | | | |
|---|---|---|---|
| 8,317,482 B2* | 11/2012 | Bois | F01D 5/141 |
| | | | 416/228 |
| 9,605,542 B2* | 3/2017 | Gallagher | F01D 5/141 |
| 11,041,388 B2* | 6/2021 | Li | F01D 5/141 |
| 2008/0107538 A1 | 5/2008 | Bois et al. | |
| 2013/0108456 A1 | 5/2013 | Stone | |

FOREIGN PATENT DOCUMENTS

| | | |
|---|---|---|
| EP | 1953341 A2 | 8/2008 |
| WO | 2015126454 A1 | 8/2015 |

OTHER PUBLICATIONS

European Search Report dated Jun. 5, 2020 from counterpart European Patent Application No. 2063650.3.

* cited by examiner

ROTOR BLADE OF A TURBOMACHINE

This application claims priority to German Patent Application DE102019107839.3 filed Mar. 27, 2019, the entirety of which is incorporated by reference herein.

The invention relates to a rotor blade of a turbomachine as per the preamble of patent claim 1, and to a rotor having rotor blade airfoils of said type.

It is known that the blades of the rotors of a turbomachine, for example the fan blades of a turbofan engine, exhibit increased blade vibrations at part load, which are referred to as blade fluttering or fluttering. Blade fluttering arises owing to synchronous blade vibrations which are coupled to aerodynamic forces at a natural frequency, such that aerodynamic forces and vibrations intensify. Such fluttering is disadvantageous and can lead to damage, to the point of blade loss.

The invention is based on the object of providing rotor blade airfoils of a turbomachine, in the case of which the risk of fluttering of the rotor blade airfoils in part-load operation is reduced.

Said object is achieved by means of a rotor blade airfoil having the features of patent claim 1, and a rotor having the features of patent claim 19. Refinements of the invention are indicated in the dependent claims.

Accordingly, the invention concerns a rotor blade airfoil of a turbomachine, which rotor blade airfoil has a leading edge and a trailing edge. A leading edge line forms along the leading edge, and a trailing edge line forms along the trailing edge. The blade airfoil furthermore has a profile chord length which is dependent on the height, wherein the profile chord is the connecting line between the leading edge and the trailing edge of the blade airfoil. The profile chord length will hereinafter refer to actual profile chord length, and the profile chords will hereinafter refer to actual profile chords, as distinct from a projected profile chord length, which will be discussed further below.

The blade airfoil has a radial extent. This defines a radial direction of the blade airfoil. An axial direction of the blade airfoil is defined as running perpendicular to the radial direction and in this case in the direction of the trailing edge. Since, in the case of a twisted blade airfoil such as is typically used, the profile chord runs in a different direction in every profile chord section, it is necessary, in order to define a unique axial direction, to select a particular profile chord section for the definition of the axial direction. In the present description, the radially lowermost profile chord section is considered here. This is the profile chord section taken immediately above the blade root. Since the blade root may be inclined in an axial direction, consideration is given to the radially lowermost complete profile chord section which comprises a point of the leading edge and a point of the trailing edge of the blade airfoil at a particular radial height of the blade airfoil.

The blade airfoil is considered in a side view, wherein the considered side view constitutes an orthogonal projection of the blade airfoil in a plane which is spanned by the axial direction and radial direction as defined above. In this side view, a maximum projected chord length is defined as the axial spacing between the axially foremost point of the leading edge and the axially rearmost point of the trailing edge of the blade airfoil. This is a projected chord length because, in the case of a twist of the blade airfoil, the leading edge and the trailing edge are the edges projected into the plane of the side view.

Provision is made whereby, with respect to the side view under consideration, the axial position of the trailing edge of the blade airfoil varies in a manner dependent on the height of the blade airfoil along a rear axial region, wherein the variation of the axial position of the trailing edge in the rear axial region amounts to at least 10% of the maximum projected chord length. The trailing edge line is thus of curved form in the side view, and its axial position varies in a manner dependent on the blade height.

Provision is furthermore made whereby the trailing edge of the blade airfoil assumes an axially rearmost point at a height of the blade airfoil that lies in the range between 20% and 50% of the total height of the blade airfoil at the trailing edge. The leading edge of the blade airfoil assumes an axially foremost point at a height of the blade airfoil that lies in the range between 15% and 35% of the total height of the blade airfoil at the leading edge.

The present invention is based on the realization that, by means of a configuration of the edge profile of a blade airfoil such that, in addition to the leading edge, the trailing edge also varies in terms of its axial extent over the height of the blade airfoil, the mechanical characteristics and aerodynamic forces can be coupled with degenerative feedback, such that the intensifying influence that leads to blade fluttering is prevented or at least reduced. Thus, by means of a curved profile of the trailing edge, the blade airfoil can be lengthened at the trailing edge in desired height regions. The associated displacement of blade mass in the direction of the trailing edge of the blade airfoil reduces blade fluttering.

Blade airfoil refers to that region of a blade which is aerodynamically effective. The blade airfoil does not include the blade root, wherein a blade is formed by blade root and blade airfoil.

It is pointed out that that region of the leading edge and of the trailing edge which extends from the respective root point at a blade root over 5% of the radial height at the leading edge and at the trailing edge is not taken into consideration in the determination of the axially foremost point of the leading edge and of the axially rearmost point of the trailing edge. Thus, the lowermost 5% of the height of leading edge and trailing edge proceeding from the hub is not taken into consideration in the determination of the axially foremost point of the leading edge and of the axially rearmost point of the trailing edge. This is the case in order that the region of the transition radii for the connection of the blade airfoil to the hub are not taken into consideration.

One embodiment of the invention provides that the variation of the axial position of the trailing edge in the rear axial region amounts to at least 20% of the maximum projected chord length. In particular, provision may be made whereby the variation of the axial position of the trailing edge in the rear axial region lies in the range between 20% and 35%, in particular in the range of 23% and 27%, of the maximum projected chord length. Where ranges are specified here and elsewhere, the boundary values of the range are in each case inclusive (closed interval).

A further embodiment of the invention provides that the variation of the axial position of the leading edge in the front axial region amounts to at least 20% of the maximum projected chord length. In particular, provision may be made whereby the variation of the axial position of the leading edge in the front axial region lies in the range between 20% and 35%, in particular in the range between 23% and 27%, of the maximum projected chord length.

In a further embodiment, the profile chord length at the blade tip of the blade airfoil lies in the range between 30% and 70%, in particular in the range between 40% and 60%, in particular in the range between 45% and 55%, of the maximum projected chord length.

In a further embodiment, the variation of the axial position of the leading edge in the front axial region and the variation of the axial position of the trailing edge in the rear axial region are identical or differ by at most 10% with respect to the variation of the axial position of the leading edge in the front axial region.

Further embodiments relate to the radial height at which the blade airfoil assumes the axially rearmost point and the axially foremost point of the axial extent, wherein the axial extent always relates to the side view under consideration, that is to say relates not to the actual profile chord length but to the projection of the actual profile chord length into the plane of the side view. Here, the axially rearmost point denotes the axial point as far as which the blade airfoil extends rearward in the side view under consideration. The axially foremost point denotes the axial point as far as which the blade airfoil extends forward in the side view under consideration.

In one embodiment of the invention, the trailing edge of the blade airfoil assumes an axially rearmost point at a height of the blade airfoil that lies in the range between 20% and 40%, in particular in the range between 33% and 37%, of the total height of the blade airfoil at the trailing edge. The height of the blade airfoil at which the trailing edge assumes the axially rearmost point influences the stiffness of the blade at the blade tip. By means of the stated range (20% to 40% or 33% to 37%), advantageous stiffness is provided at the blade tip, which prevents or reduces blade fluttering in part-load operation.

In a further embodiment, the leading edge of the blade airfoil assumes an axially foremost point at a height of the blade airfoil that lies in the range between 15% and 28%, in particular in the range between 18% and 24%, of the total height of the blade airfoil at the leading edge.

The maximum profile chord length of the blade airfoil is realized at that height of the blade airfoil at which the spacing between the leading edge and the trailing edge is at its greatest. In embodiments of the invention, the maximum profile chord length is realized at a height of the blade airfoil that lies in the range between 15% and 65%, in particular in the range between 50% and 60%, of the total height of the blade airfoil at the leading edge. This means that the maximum axial extent of the blade airfoil lies in the lower half of the blade airfoil or only slightly above the midpoint of the height in relation to the height of the blade airfoil at the leading edge.

It is pointed out that the profile chord length is not a projected chord length but rather the actual profile chord length. The projected profile chord length presented in the side view is equal to the actual profile chord length only for that profile chord section which defines the axial direction.

It is furthermore pointed out that the maximum profile chord length constitutes a different parameter than the maximum projected chord length defined above. The maximum profile chord length refers to a maximum chord length that the blade airfoil assumes at a particular radial height of the blade. The maximum projected chord length as defined above refers to the spacing between the axially foremost point of the leading edge and the axially rearmost point of the trailing edge firstly in the side view under consideration and secondly irrespective of the radial height of the blade.

Further embodiments of the invention relate to the course of the leading edge line and of the trailing edge line of the blade airfoil in the side view under consideration. The leading edge line and the trailing edge line in this case describe the spatial course of the leading edge and of the trailing edge in the side view under consideration. Here, embodiments are basically possible in which the leading edge line and/or the trailing edge line are realized with or without inflection points in the side view under consideration.

One refinement in this regard provides that the leading edge line of the blade airfoil in the side view under consideration, with regard to the de-rotated blade wheel, has no inflection point and in this case has exactly one local extreme value, which is equal to the axially foremost point. The blade airfoil is accordingly concavely curved over its entire leading edge.

A further embodiment provides that the leading edge line of the blade airfoil in the side view under consideration, with regard to the de-rotated blade wheel, has at least one inflection point at which the curvature of the leading edge line changes its sign. Design variants in this regard provide that the leading edge line of the blade airfoil has one inflection point and two local extreme values of the axial position, or that the leading edge line of the blade airfoil has two inflection points and three local extreme values of the axial position.

With regard to the course of the trailing edge line, one embodiment of the invention provides that the trailing edge line of the blade airfoil in the side view under consideration, with regard to the de-rotated blade wheel, has at least one inflection point. In other embodiments, the trailing edge line of the blade airfoil in the side view under consideration has two inflection points and two or three local extreme values of the axial position, or three inflection points and four local extreme values of the axial position.

One embodiment of the invention provides that the blade airfoil is designed such that, in at least one vibration mode, the blade airfoil vibrates In a circumferential direction of the rotor at its blade tip, such that the deflection at the leading edge and at the trailing edge is equal in the region of the blade tip. Such vibration behavior is preferably realized for a multiplicity of modes, for example four to eight vibration modes. Through the provided variation of the axial position of leading edge and trailing edge of the blade airfoil, it is possible here for the trailing edge of the blade in the side view under consideration to be bulged axially rearward in certain radial regions in order to realize such vibration behavior. This may be combined with an increase of the projected profile chord length at the blade midpoint. The exact course of the leading edge and of the trailing edge may be defined by means of optimization methods.

A rotor blade airfoil with an advantageous combination of parameters is specified by the coordinate claim 18.

According to a further aspect of the present invention, said invention provides a rotor of a compressor stage of a turbomachine, which rotor comprises a multiplicity of rotor blade airfoils according to the present invention. Here, a rotor blade airfoil and a blade root form in each case one rotor blade.

Here, one embodiment provides that the rotor is of integrated construction, in particular of BLISK construction or BLING construction. In the case of rotors of BLISK construction, the rotor disk, the rotor hub and the rotor blades are formed integrally (as a single piece) (BLISK="Blade Integrated Disk"). In the case of rotors of BLING construction, the rotor hub and the rotor blades are formed integrally (as a single piece) (BLING="Blade Integrated Ring"). In the context of this description, for the sake of simplicity, both of these variants are referred to as "BLISK construction". In both cases, there is little damping at the transition between blade and rotor hub, such that rotors of BLISK construction are more sensitive than conventional rotors to vibration excitation. The present invention, which prevents or reduces blade fluttering in part-load operation, realizes particular advantages in the case of rotors of BLISK construction.

One embodiment of the invention provides that the rotor is a fan of integrated construction. Alternatively, the rotor is for example a rotor of integrated construction of a compressor inlet stage of a compressor.

According to a further aspect of the invention, the invention relates to a compressor having a rotor according to the invention, wherein the compressor is for example a fan, a low-pressure compressor, a medium-pressure compressor or a high-pressure compressor of a gas turbine engine.

According to a further aspect of the invention, the invention relates to a blade which comprises a blade root in addition to a blade airfoil according to the invention.

In a further aspect of the invention, the invention relates to a gas turbine engine which has:
- an engine core which comprises a turbine, a compressor and a core shaft connecting the turbine to the compressor and formed as a hollow shaft;
- a fan which is positioned upstream of the engine core, wherein the fan comprises a plurality of fan blades; and
- a transmission that receives an input from the turbine shaft and outputs drive to the fan so as to drive the fan at a lower rotational speed than the turbine shaft. Here, the fan and/or at least one rotor of the compressor are formed with blade airfoils designed in the manner according to the invention.

One design embodiment in this regard may provide that
- the turbine is a first turbine, the compressor is a first compressor, and the turbine shaft is a first turbine shaft;
- the engine core further comprises a second turbine, a second compressor, and a second turbine shaft which connects the second turbine to the second compressor; and
- the second turbine, the second compressor, and the second turbine shaft are disposed with a view to rotating at a higher rotational speed than the first turbine shaft.

It is pointed out that the rotor blade airfoil is described in relation to the coordinate system of a plane defined by the radial direction h and the axial direction x, wherein the axial direction is defined by the extent direction of the profile chord in a radially lowermost profile chord section of the blade airfoil. Here, the radial direction is identical to the radial direction of a turbomachine in which the rotor blade airfoil according to the invention is arranged. The axial direction as defined above may be identical to the longitudinal direction, defined by the machine axis, of a turbomachine in which the rotor blade airfoil according to the invention is arranged. This is however not imperatively the case. If the blade root and thus the radially lowermost profile chord section is oriented in a manner twisted with respect to the machine axis of the turbomachine, then the axial direction differs from the direction defined by the machine axis. The definition of the axial direction given here in relation to the rotor blade airfoil is valid irrespective of whether or not the rotor blade airfoil is twisted in relation to the machine axis. Terms such as "in front of", "behind", "front", and "rear" relate to the axial direction. Terms such as "outer" or "inner" relate to the radial direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Arrangements of the present disclosure can be particularly, although not exclusively, beneficial for fans that are driven via a gear box. Accordingly, the gas turbine engine may comprise a gear box that receives an input from the core shaft and outputs drive for the fan so as to drive the fan at a lower rotational speed than the core shaft. The input to the gear box may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, second compressor and second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gear box may be arranged so as to be driven by that core shaft (for example the first core shaft in the example above) which is configured to rotate (for example during use) at the lowest rotational speed. For example, the gear box may be arranged so as to be driven only by that core shaft (for example only by the first core shaft, and not the second core shaft, in the example above) which is configured to rotate (for example during use) at the lowest rotational speed. Alternatively thereto, the gear box may be arranged so as to be driven by one or a plurality of shafts, for example the first and/or the second shaft in the example above.

In the case of a gas turbine engine as described and/or claimed herein, a combustion chamber may be provided axially downstream of the fan and of the compressor(s). For example, the combustion chamber can lie directly downstream of the second compressor (for example at the exit of the latter), if a second compressor is provided. By way of further example, the flow at the exit of the compressor may be supplied to the inlet of the second turbine, if a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (in the sense that the angle of incidence of said variable stator blades may be variable). The row of rotor blades and the row of stator blades may be axially offset from one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span width extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which can simply be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) speed of the fan tip, for example at the leading periphery of the tip (which can be defined as the fan tip radius at the leading periphery multiplied by the angular speed). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure can have any desired bypass ratio, where the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). By way of non-limiting example, the overall pressure ratio of a gas turbine engine as described and/or claimed herein at constant speed can be greater than (or in the magnitude of): 35, 40, 45, 50, 55, 60, 65, 70, 75. The overall pressure ratio may be in an inclusive range delimited by two of the values in the previous sentence (that is to say that the values may form upper or lower limits).

The specific thrust of an engine can be defined as the net thrust of the engine divided by the total mass flow through the engine. The specific thrust of an engine as described and/or claimed herein at cruise conditions may be less than (or of the order of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

In use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide blade. At cruising speed, the TET may be at least (or of the order of): 1400 K, 1450 K, 1500 K, 1550 K, 1600 K, or 1650 K. The TET at constant speed may be in an inclusive range delimited by two of the values in the previous sentence (that is to say that the values may form upper or lower limits). The maximum TET in the use of the engine may be at least (or of the order of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade described and/or claimed herein may be manufactured from any suitable material or a combination of materials. For example, at least a part of the fan blade and/or of the airfoil can be manufactured at least in part from a composite, for example a metal matrix composite and/or an organic matrix composite, such as carbon fiber. By way of further example, at least a part of the fan blade and/or of the airfoil can be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of further example, the fan blades can be formed integrally with a central portion. Such an arrangement may be referred to as a blisk or a bling. Any suitable method may be used to manufacture such a blisk or such a bling. For example, at least a part of the fan blades can be machined from a block and/or at least a part of the fan blades can be attached to the hub/disk by welding, such as linear friction welding, for example.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20, 22 or 24 fan blades.

As used herein, cruise conditions can mean cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example in the magnitude of Mach 0.8, in the magnitude of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10000 m to 15000 m, for example in the range from 10000 m to 12000 m, for example in the range from 10 400 m to 11600 m (around 38000 ft), for example in the range from 10500 m to 11500 m, for example in the range from 10600 m to 11400 m, for example in the range from 10700 m (around 35000 ft) to 11300 m, for example in the range from 10800 m to 11200 m, for example in the range from 10900 m to 11100 m, for example of the order of 11000 m. The cruise conditions may correspond to standard atmospheric conditions at any given altitude in these ranges.

Purely by way of example, the cruise conditions may correspond to the following: a forward Mach number of 0.8; a pressure of 23000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

In use, a gas turbine engine described and/or claimed herein can operate at the cruise conditions defined elsewhere herein. Such cruise conditions can be determined by the cruise conditions (for example the mid-cruise conditions) of an aircraft to which at least one (for example 2 or 4) gas turbine engine can be fastened in order to provide the thrust force.

It is self-evident to a person skilled in the art that a feature or parameter described above in relation to one of the above aspects can be applied to any other aspect, unless these are mutually exclusive. Furthermore, any feature or any parameter described here may be applied to any aspect and/or combined with any other feature or parameter described here, unless these are mutually exclusive.

The invention will be explained in more detail below on the basis of a plurality of exemplary embodiments with reference to the figures of the drawing. In the drawing.

Figure 5:
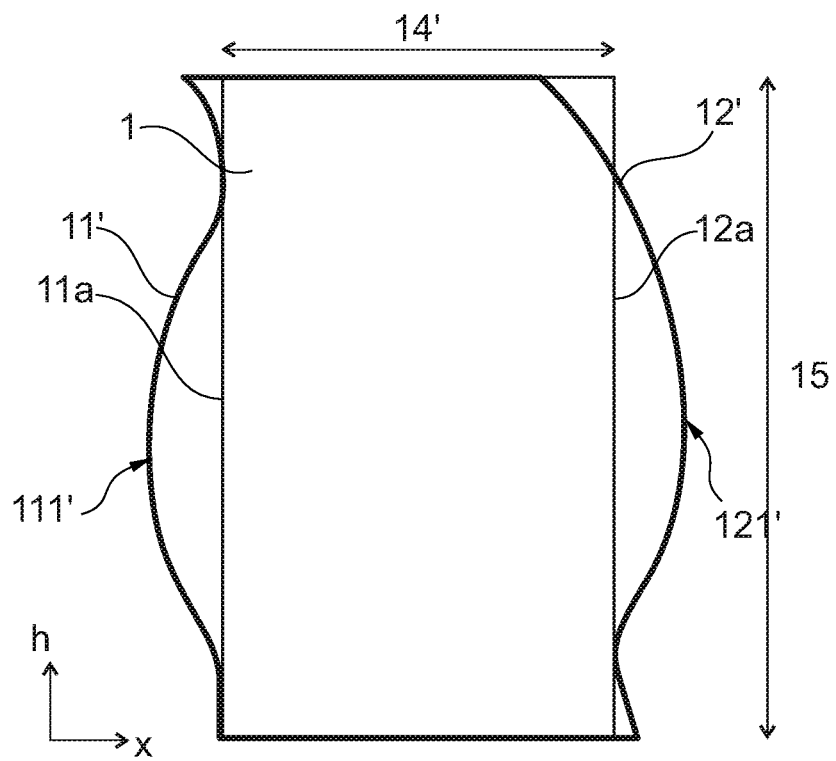
Figure 6:
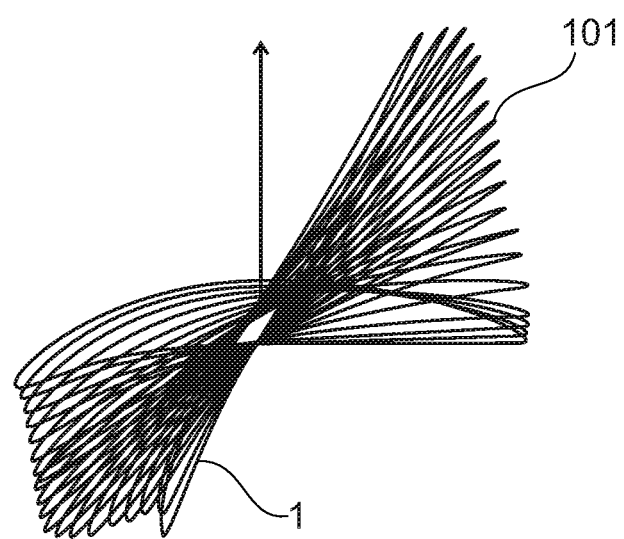
Figure 7:
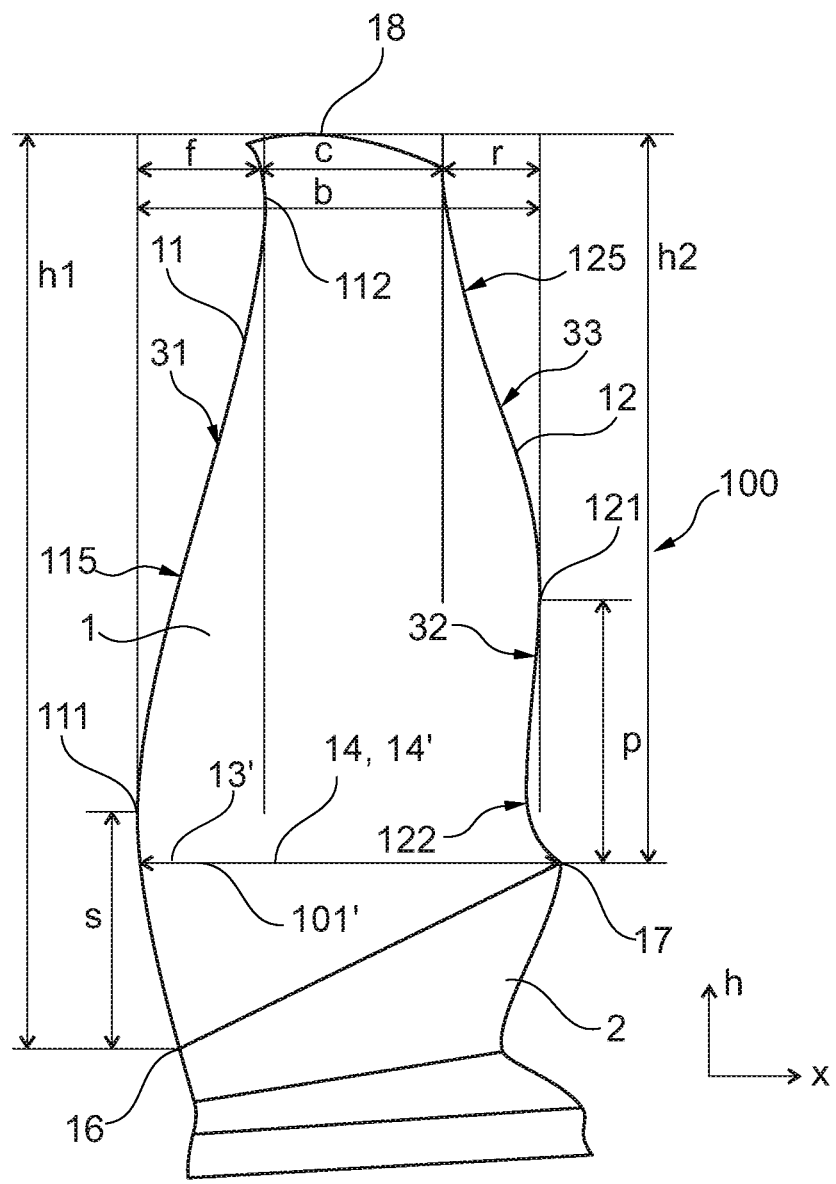
Figure 8:
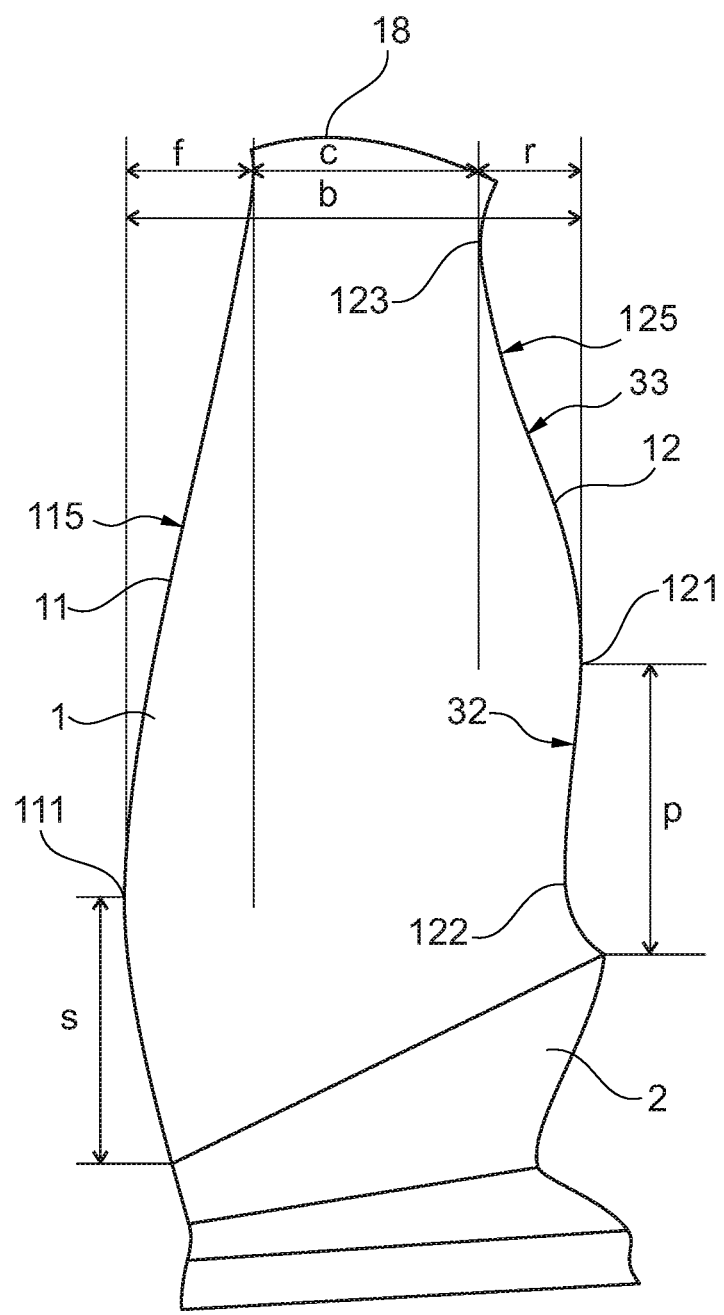
Figure 9:
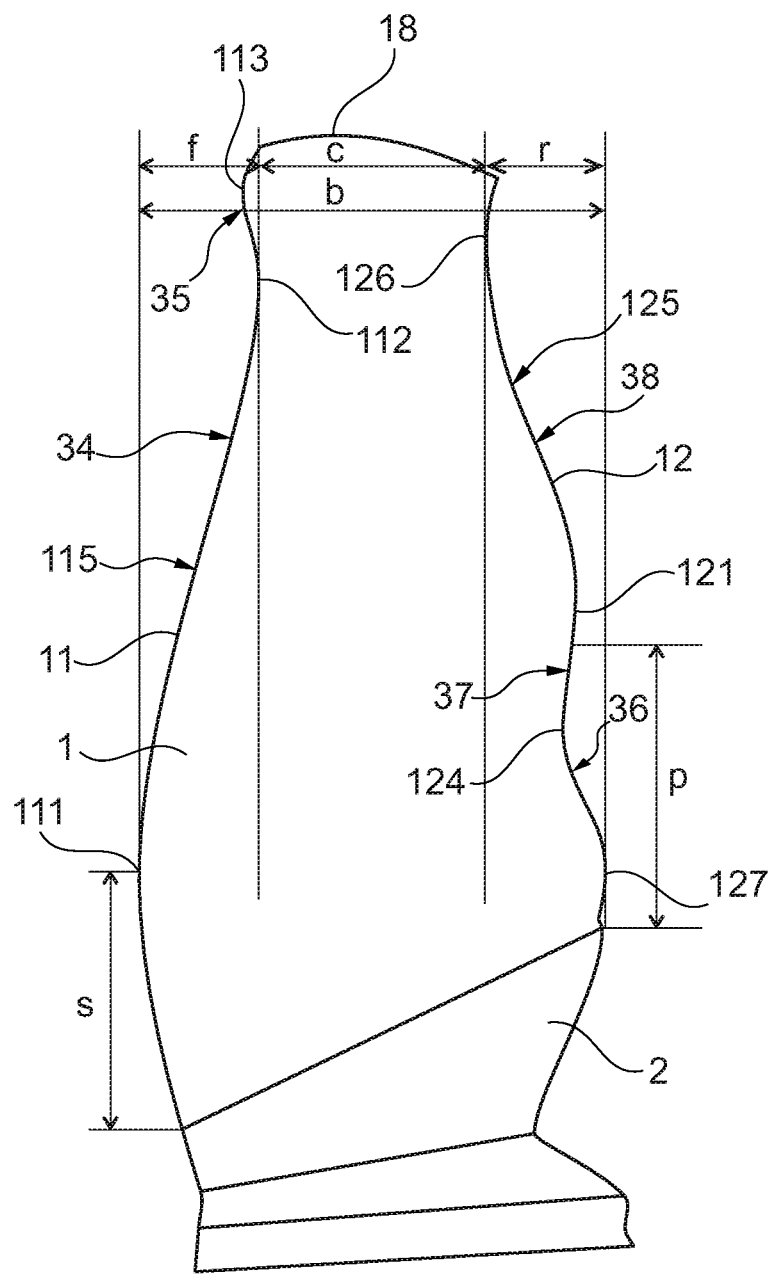
Figure 10:
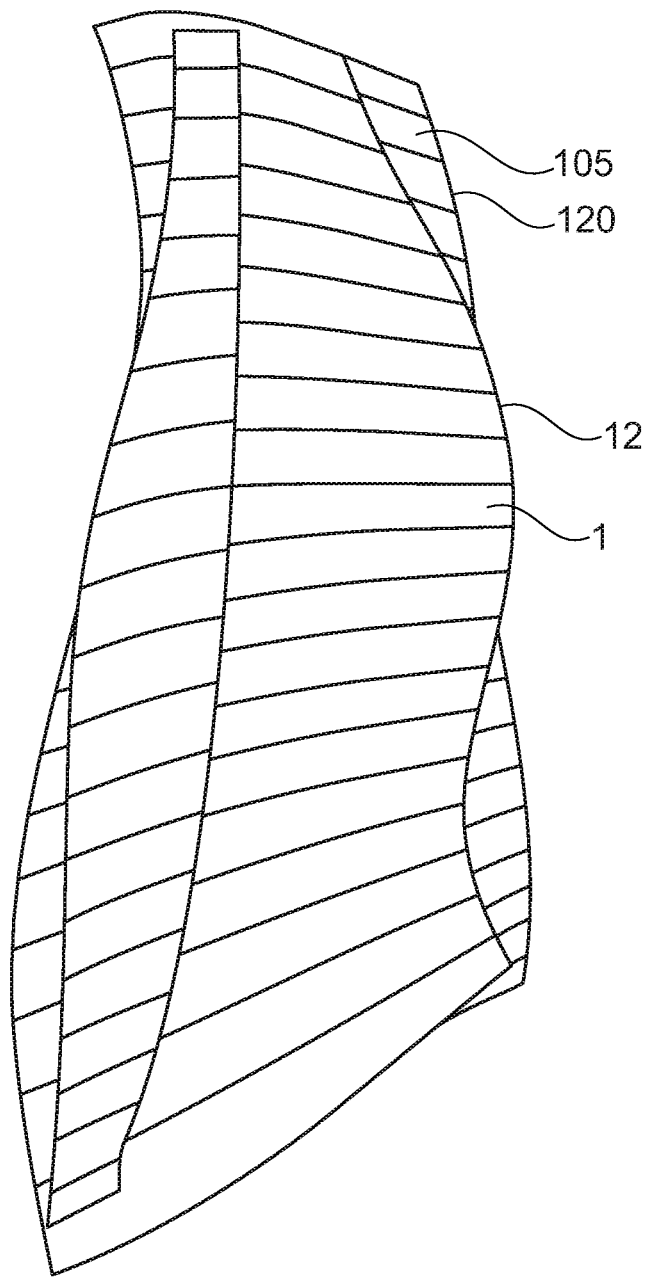
Figure 11:
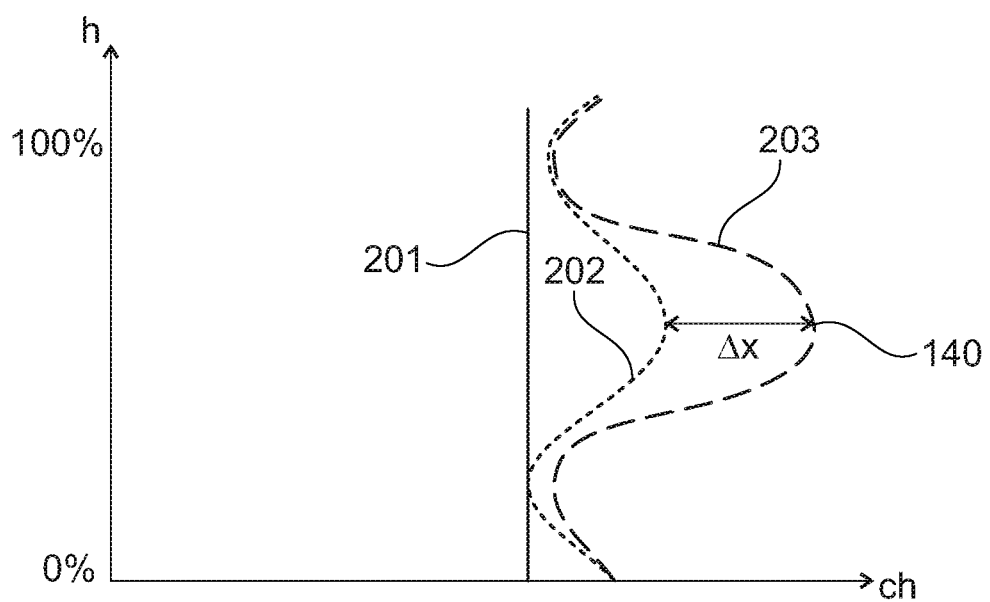

FIG. 5 schematically shows, in a side view, multiple variants of an untwisted blade airfoil which is of straight or curved form at the leading edge and at the trailing edge, FIG. 6 schematically shows a view from above of a twisted blade airfoil, wherein the illustration shows a multiplicity of profile chord sections of the blade airfoil which are arranged one above the other correspondingly to the twist of the blade airfoil;

FIG. 7 shows, in a side view, a first exemplary embodiment of a rotor blade airfoil in the case of which the axial position of the leading edge and the axial position of the trailing edge vary in a manner dependent on the blade height;

FIG. 8 shows, in a side view, a second exemplary embodiment of a rotor blade airfoil in the case of which the axial position of the leading edge and the axial position of the trailing edge vary in a manner dependent on the blade height;

FIG. 9 shows, in a side view, a third exemplary embodiment of a rotor blade airfoil in the case of which the axial position of the leading edge and the axial position of the trailing edge vary in a manner dependent on the blade height;

FIG. 10 schematically shows the juxtaposed illustration of a rotor blade airfoil according to the prior art and of the rotor blade airfoil having a trailing edge line whose axial position varies; and FIG. 11 shows the variation of the profile chord length in a manner dependent on the blade height for a rotor blade airfoil with straight blade edges, a rotor blade airfoil with a curved leading edge and a rotor blade airfoil with a curved leading edge and a curved trailing edge.

Figure 1:
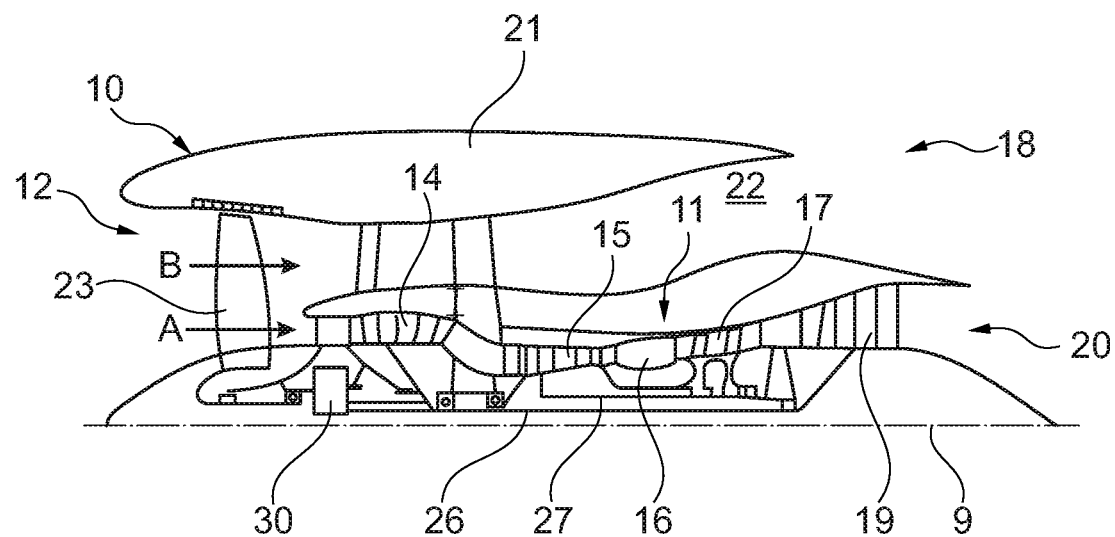
FIG. 1 shows a lateral sectional view of a gas turbine engine.

FIG. 1 illustrates a gas turbine engine 10 having a principal rotational axis 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass airflow B flows through the bypass duct 22. The fan 23 is attached to and driven by the low pressure turbine 19 by way of a shaft 26 and an epicyclic gearbox 30.

During use, the core airflow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before they are expelled through the nozzle 20 to provide a certain thrust. The high-pressure turbine 17 drives the high-pressure compressor 15 by means of a suitable connecting shaft 27. The fan 23 generally provides the major part of the thrust force. The epicyclic gear box 30 is a reduction gear box.

Figure 2:
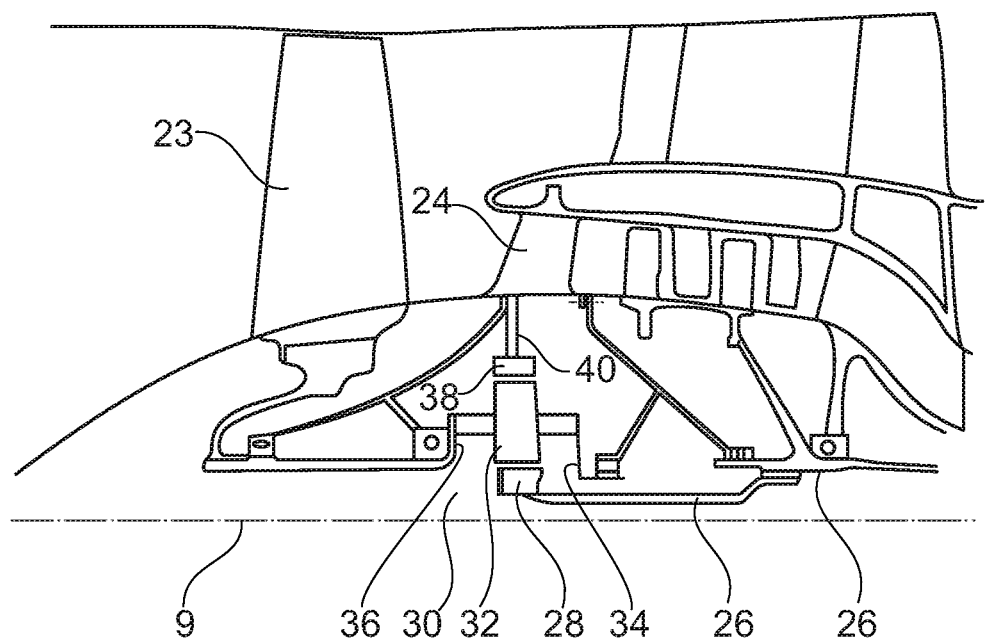
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gear box assembly 30. Multiple planet gears 32, which are coupled to one another by a planet carrier 34, are situated radially to the outside of the sun gear 28 and mesh therewith. The planet carrier 34 limits the planet gears 32 to orbiting around the sun gear 28 in a synchronous manner while enabling each planet gear 32 to rotate about its own axis. The planet carrier 34 is coupled by way of linkages 36 to the fan 23 so as to drive the rotation of the latter about the engine axis 9. Radially to the outside of the planet wheels 32 and intermeshing therewith is an external gear or ring gear 38 that is coupled, via linkages 40, to a stationary supporting structure 24.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
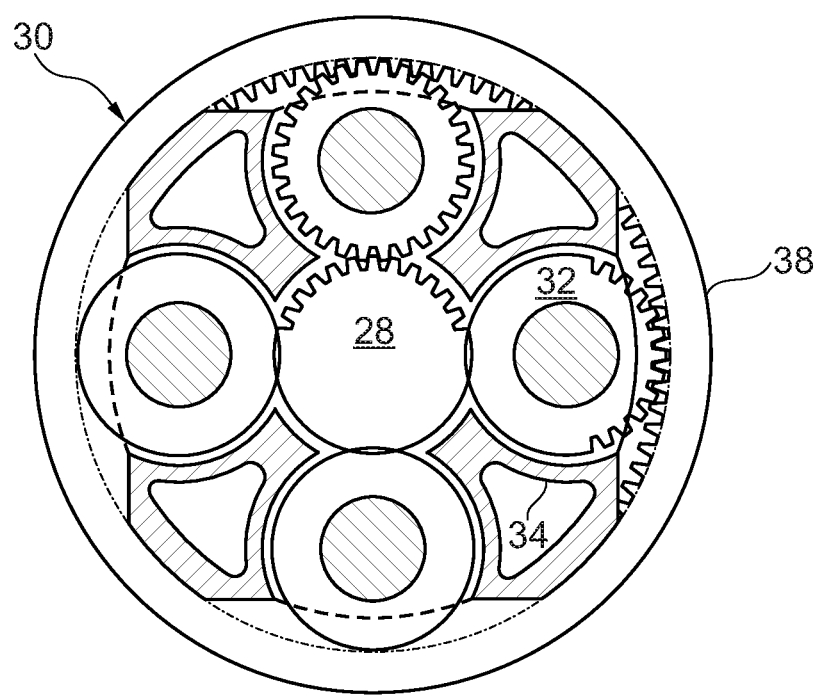
FIG. 3 shows a partially cut-away view of a gearbox for a gas turbine engine.

The epicyclic gear box 30 is shown in an exemplary manner in greater detail in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic gear box 30 generally comprise at least three planet gears 32.

The epicyclic gear box 30 illustrated by way of example in FIGS. 2 and 3 is a planetary gear box, in that the planet carrier 34 is coupled to an output shaft via linkages 36, wherein the ring gear 38 is fixed. However, any other suitable type of epicyclic gear box 30 can be used. By way of further example, the epicyclic gearbox 30 can be a star arrangement, in which the planet carrier 34 is held so as to be fixed, wherein the ring gear (or annulus) 38 is allowed to rotate. In the case of such an arrangement, the fan 23 is driven by the ring gear 38. As a further alternative example, the gear mechanism 30 can be a differential gear mechanism in which both the ring gear 38 and the planet carrier 34 are allowed to rotate.

It will be appreciated that the arrangement shown in FIGS. 2 and 3 is by way of example only, and various alternatives are within the scope of protection of the present disclosure. Purely by way of example, any suitable arrangement can be used for positioning the gearbox 30 in the engine 10 and/or for connecting the gearbox 30 to the engine 10. By way of a further example, the connections (such as the linkages 36, 40 in the example of FIG. 2) between the gear box 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gear box and the fixed structures, such as the gear box casing) may be used, and the disclosure is not limited to the exemplary arrangement of FIG. 2. For example, where the gear mechanism 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having an arbitrary arrangement of gear box types (for example star-shaped or planetary), support structures, input and output shaft arrangement, and bearing positions.

Optionally, the gear mechanism may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. By way of a further example, the gas turbine engine shown in FIG. 1 has a split flow nozzle 20, 22, meaning that the flow through the bypass duct 22 has its own nozzle that is separate from and radially outside the core engine nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable area. Although the example described relates to a turbofan engine, the disclosure can be applied, for example, to any type of gas turbine engine, such as, for example, an open rotor engine (in which the fan stage is not surrounded by an engine nacelle) or a turboprop engine. In some arrangements, the gas turbine engine 10 may not comprise a gear mechanism 30.

The geometry of the gas turbine engine 10, and components thereof, is/are defined by a conventional axis system, comprising an axial direction (which is aligned with the rotation axis 9), a radial direction (in the bottom-to-top direction in FIG. 1), and a circumferential direction (perpendicular to the view in FIG. 1). The axial, radial and circumferential directions run so as to be mutually perpendicular.

In the context of the present invention, the design of the blade airfoils of the rotors is of importance. Here, the invention may basically be used for the blade airfoils of a fan and/or for the blade airfoils of one or more of the rotors of a low-pressure compressor, of a medium-pressure compressor (if present) and/or of a high-pressure compressor.

Figure 4:
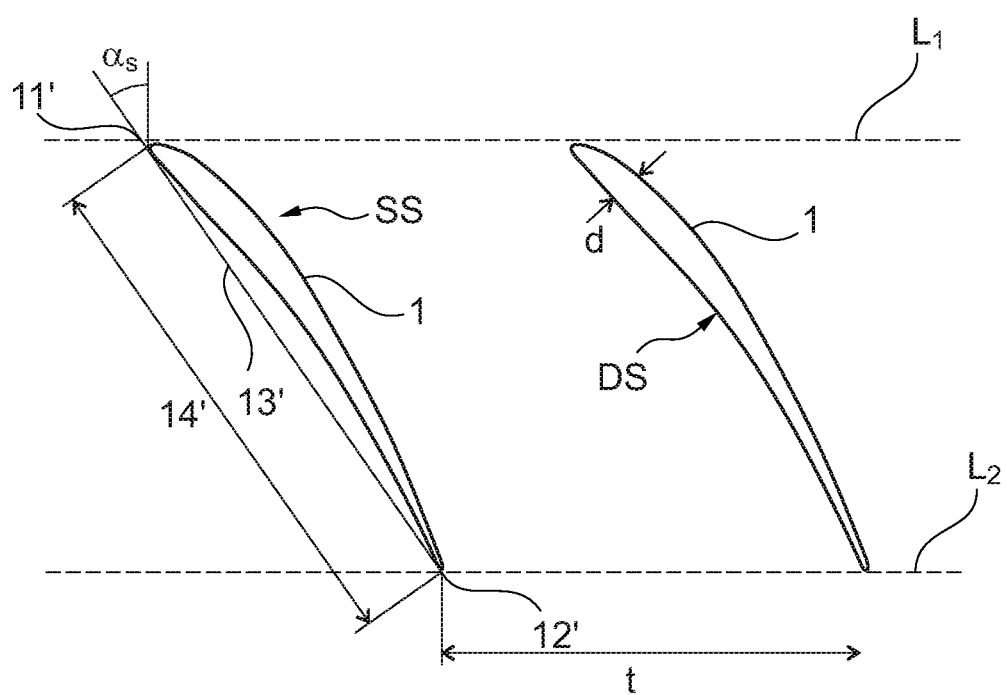
FIG. 4 shows the geometrical construction and basic designations in a rotor cascade.

The basic construction of a rotor cascade will firstly be described on the basis of FIG. 4. The rotor cascade is illustrated in a conventional illustration in meridional section and in a developed view. Said rotor cascade comprises a multiplicity of blade airfoils 1, which each have a leading edge 11' and a trailing edge 12'. The leading edges 11' lie on an imaginary line $L_1$, and the trailing edges 12' lie on an imaginary line $L_2$. The lines $L_1$ and $L_2$ run parallel. The blade airfoils 1 furthermore each comprise a suction side SS and a pressure side DS. Their maximum profile thickness is denoted by d.

The rotor cascade has a cascade pitch t, and each of the blade airfoils 1 has a profile chord 13' with a profile chord length 14'. The profile chord 13' is the connecting line between the leading edge 11' and the trailing edge 12' of the profile. The blade stagger angle $\alpha_s$ is formed between the profile chord 13' and the perpendicular to the line $L_1$. The stagger angle $\alpha_s$ indicates the inclination of the blade airfoils 1. The profile chord 13' and the profile chord length 14' will hereinafter also be referred to as actual profile chord 13' and actual profile chord length 14', as distinct from a projected profile chord and a projected profile chord length which are present in a side view.

Accordingly, below, one of the blade airfoils 1 of a rotor will be considered in a side view, wherein each of the blade airfoils of the rotor or at least some of the blade airfoils of the rotor are designed in the manner described.

FIG. 6 shows, in a schematic illustration, a twisted blade airfoil such as is typically used. Here, the illustration of FIG. 6 shows a multiplicity of profile chord sections 101 of a blade airfoil 1 taken at different heights h of the blade airfoil and illustrated one above the other correspondingly to the twist of the blade airfoil 1. A profile chord section 101 is taken in a plane in which all points have the same radial height h. The profile chord runs in a different direction in each profile chord section 101.

FIG. 5 shows, in a schematic illustration, a blade airfoil 1 which, in the conventional manner, has a leading edge 11a and a trailing edge 12a which extend rectilinearly, such that the profile chord length 14, which corresponds to the spacing between the leading edge 11a and the trailing edge 12a, is substantially constant over the height 15 of the blade airfoil 1.

Here, the illustration of FIG. 5 is selected such that the untwisted blade airfoil is considered, in the case of which the profile chord sections 101 (cf. FIG. 6) have been rotated over one another such that the profile chords of the profile chord sections 101 are arranged in one plane. In the plane under consideration, the x axis denotes the axial extent of the blade airfoil and the y axis denotes the radial height h of the blade airfoil. FIG. 5 furthermore shows a first variation, in the case of which the leading edge 11' does not run rectilinearly but is of curved form, and in this case, in the projection or side view under consideration, forms a point 111' at which it extends axially forward to a maximum extent. Rotors with rotor blades whose leading edge is of curved form are known in the case of fan blades and are also referred to as "swept fan" blades.

FIG. 5 furthermore shows a second variation, in the case of which, in addition to the leading edge, also the trailing edge 12' is of curved form, and in this case, in the side view under consideration, forms a point 121' at which it extends axially rearward to a maximum extent. In this variation, the profile chord length is thus lengthened rearward at the trailing edge 12'.

FIGS. 7 to 9 show a blade airfoil 1 twisted correspondingly to FIG. 6 in a side view, that is to say in an orthogonal projection of the blade airfoil 1 into the plane of a side view. The advantage of an illustration of the blade airfoil 1 in a side view consists in that the relative ratios of the variation of leading edge and trailing edge of the blade airfoil 1 apply irrespective of the design of the rotor. This is because, depending on the design of the rotor for a particular rotational speed, the actual profile chord lengths may vary in the case of different rotors.

The plane of the side view is defined as follows. Said plane has a radial direction h which corresponds to the radial extent of the blade airfoil. An axial direction of the blade airfoil is defined as running perpendicular to the radial direction h and in this case in the direction of the trailing edge. Since, in the case of a twisted blade airfoil corresponding to FIG. 6, the profile chord runs in a different direction in every profile chord section, it is necessary, in order to define a unique axial direction, to select a particular profile chord section for the definition of the axial direction. In the present case, the radially lowermost profile chord section is considered, as will be discussed in more detail on the basis of FIG. 7.

FIG. 7 shows an exemplary embodiment of a rotor blade airfoil 1 in the case of which both the projected leading edge 11 and the projected trailing edge 12 (hereinafter referred to merely as leading edge 11 and trailing edge 12) vary in the axial direction x over the height h. The leading edge 11 forms a leading edge line 115 which describes the spatial course of the leading edge 11 in the side view under consideration. The trailing edge 12 forms a trailing edge line 125 which describes the spatial course of the trailing edge 12 in the side view under consideration.

The blade airfoil 1 forms the aerodynamically effective part of a blade 100 which, aside from the blade airfoil 1, comprises a blade root 2. The blade root 2 is connected to a rotor disk or is formed integrally with a rotor disk. At its upper end, the blade airfoil 1 forms a blade tip 18.

At the leading edge 11, the blade airfoil 1 has a total height h1. At the trailing edge 12, the blade airfoil 1 has a total height h2. Here, the total heights h1, h2 at the leading edge 11 and at the trailing edge 12 differ owing to a height of the blade root 2 which increases in an axial direction. Here, the blade airfoil 1 forms, at the leading edge 11, a front root point 16, from which said blade airfoil extends from the blade root 2 at the leading edge 11. Correspondingly, the blade airfoil forms, at the trailing edge 12, a rear root point 17, from which said blade airfoil extends from the blade root 2 at the trailing edge 12.

The definition of the x direction in the side view under consideration will be discussed in more detail on the basis of FIG. 7. As stated, the direction of the profile chord in the radially lowermost profile chord section is considered for the definition of a unique axial direction. This is the profile chord section taken immediately above the blade root 2. Since the blade root 2 is inclined, specifically increases in height, in an axial direction, consideration is given to the radially lowermost complete profile chord section which comprises a point of the leading edge 11 and a point of the trailing edge 12 of the blade airfoil 1 at a particular radial height of the blade airfoil. This is the profile chord section 101' running through the rear root point 17. It is pointed out that it is only true for this profile chord section 101', which defines the axial direction, that the profile chord length 14 presented in the side view under consideration is equal to the actual profile chord length 14' of the actual profile chord 13'. The profile chords in other profile chord sections are presented in a projection in the side view of FIG. 7 (and of FIGS. 8 and 9).

In FIG. 7, the blade airfoil 1 has a maximum projected chord length b. This is defined as the axial spacing between the axially foremost point 111 of the leading edge 11 and the axially rearmost point 121 of the trailing edge 12 of the blade airfoil 1 in the side view under consideration. Here, that region which is directly adjacent to the blade root 2 and which extends from the respective root point 16, 17 over 5% of the radial height at the leading edge and at the trailing edge respectively is not taken into consideration in the definition of the axially foremost point 111 and of the axially rearmost point 121. This applies to all embodiments of the invention.

Furthermore, a region f is defined which indicates the axial variation of the axial position of the leading edge 11 in the side view under consideration in a manner dependent on the height h of the blade airfoil 1. Correspondingly, a region r is defined which indicates the axial variation of the axial position of the trailing edge 12 in the side view under consideration in a manner dependent on the height h of the blade airfoil 1. Furthermore, an axial length c is defined which is equal to the maximum chord length b minus the regions f and r. The axial length c corresponds at least approximately to the axial length of the blade tip 18.

A further parameter of the blade airfoil 1 is given by the radial height S at which the leading edge 11 forms the axially foremost point 111. Here, the height S is measured from the front root point 16 of the blade airfoil 1, from which the blade airfoil 1 extends from the blade root 2 at the leading edge 11. Correspondingly, a radial height P is defined at which the trailing edge 12 forms the axially rearmost point 121. Here, the height P is measured from the rear root point 17 of the blade airfoil 1, from which the blade airfoil 1 extends from the blade root 2 at the trailing edge 12.

In exemplary embodiments, the individual parameters b, f, r, c, S and P have the following relationships.

The axial region f lies in the range between 20% and 35%, in particular in the range between 23% and 27%, of the maximum projected chord length b: $0.23b \leq f \leq 0.27b$. For example, f lies at 25% of the maximum projected chord length b.

The axial region r lies in the range between 20% and 35%, in particular in the range between 23% and 27%, of the maximum projected chord length b: $0.23b \leq r \leq 0.27b$. For example, r lies at 25% of the maximum projected chord length b.

The maximum axial extent of the blade airfoil c at the blade tip lies in a range between 40% and 60%, in particular in the range between 45% and 55%, of the maximum projected chord length: $0.45b \leq c \leq 0.55b$. For example, c lies at 50% of the maximum projected chord length b.

In one embodiment, the regions f and r differ in terms of their axial extent by at most 20% in relation to the axial extent of the region f, that is to say the blade airfoil is shaped such that a bulge is realized axially forward and axially rearward substantially to equal extents. Here, exemplary embodiments provide that the values of f and r are identical or different by at most 10% with respect to the axial extent of the region f, such that a high degree of symmetry is present with regard to the variation of the course of the leading edge 115 and of the trailing edge 125.

The height S, which indicates the height of the axially foremost point 111 at the leading edge 11, lies in a range between 15% and 35%, in particular in a range between 15% and 25%, in particular in a range between 18% and 24%, of the total height h1 of the blade at the leading edge: $0.18h1 \leq S \leq 0.24h1$. In one exemplary embodiment, S lies at 21% of the total height h1 of the blade at the leading edge.

The height P, which indicates the height of the axially rearmost point 121 at the trailing edge 12, lies in a range between 20% and 50%, in particular in a range between 30% and 40%, in particular in a range between 33% and 37%, of the total height h2 of the blade at the trailing edge: $0.33h2 \leq P \leq 0.37h2$. In one exemplary embodiment, P lies at 35% of the total height h2 of the blade at the trailing edge.

One exemplary embodiment thus provides the following combination of the values f, c, r, S and P: f=0.25b, r=0.25b, c=0.5b, S=0.21h1 and P=0.35h2.

Further parameters relate to the number of inflection points of the leading edge line 115 and of the trailing edge line 125. In the exemplary embodiment of FIG. 7, the leading edge 11 has an inflection point 31 along the leading edge line 115, at which inflection point the curvature of the leading edge line 115 changes its sign. Here, the leading edge line 15 forms two local extremes of the axial extent, specifically the axially foremost point 111 and the point 112. The trailing edge line 125 forms two inflection points 32, 33 and two local extremes of the axial extent, specifically the axially rearmost point 121 and the further point 122.

Proceeding from the rear root point 17 to the blade root 2, the trailing edge line 125 runs initially in concave fashion, that is to say is recessed in the direction of the leading edge 150. After the inflection point 32, the trailing edge line assumes a convex shape, that is to say is bulged outward toward the rear. In the concave region, said trailing edge line forms the axially rearmost point 121. After the further inflection point 33, the shape is again concave.

FIGS. 8 and 9 show, in the case of a construction of the blade airfoil 1 basically identical to that in the exemplary embodiment of FIG. 7, variations in the course of the leading edge line 115 and of the trailing edge line 125.

Accordingly, in FIG. 8, provision is made whereby the leading edge line 115 has no inflection point and has only one extreme, which it forms at the axially foremost point 111. The trailing edge line 125 forms two inflection points 32, 33 and three local extremes, specifically the axially rearmost point 121 and two further points 122, 123.

In FIG. 9, provision is made whereby the leading edge curve 115 has two inflection points 34, 35 and three local extremes, specifically the axially foremost point 111 and two further points 112, 113. In this exemplary embodiment, the trailing edge line 125 forms three inflection points 36, 37, 38 and four local extremes, specifically the axially rearmost point 121 and three further points 124, 126, 127.

FIG. 10 shows, by way of example and in schematic form, firstly a blade airfoil 1 according to the invention with a curved trailing edge 12 and a blade airfoil 105 designed according to the prior art, which has a trailing edge 120 of substantially straight form. The two blade airfoils 1, 105 are shown one inside the other in order to more clearly illustrate the differences in the course. Owing to the curved course, the trailing edge 12 of the blade airfoil 1 extends further rearward in certain height regions of the blade airfoil 1, whereby blade fluttering at part load is reduced.

FIG. 11 shows, by way of example, the actual (not the projected) profile chord length ch of a blade airfoil in a manner dependent on the height h of the blade. The graph 201 shows a blade airfoil which is curved neither at the leading edge nor at the trailing edge, and the profile chord length of which is accordingly constant over the entire height h. The graph 202 shows a blade airfoil which is curved only at the leading edge. The profile chord length ch varies in a manner dependent on the height h, wherein the profile chord length ch is at a maximum at a midpoint of the height of the blade. The graph 203 shows a blade airfoil which is curved both at the leading edge and at the trailing edge. The profile chord length ch varies over the height h in an even more pronounced manner than in the case of the graph 202, wherein the profile chord length has a maximum 140 at a midpoint of the height of the blade. The maximum 140 is attained for example at a height of the blade which lies in a range between 15% and 65%, in particular in the range between 30% and 60%, in particular in the range between 50% and 60%, in particular in the range between 55% and 60%, of the total height of the blade at the leading edge. The increase of the profile chord length ch from the graph 202 to the graph 203 is denoted by $\Delta x$.

The solution according to the graph 203 thus permits a particularly pronounced variation of the profile chord length over the blade height h. As can also be seen in FIG. 5, in this case both the leading edge is bulged axially toward the front and the trailing edge is bulged axially toward the rear, resulting in improved stability with respect to blade fluttering.

In one design variant, the variation of the profile chord length may be realized such that, by means of a more pronounced bulge of the blade airfoil at the trailing edge, the blade airfoil is designed such that, in at least one vibration mode, the blade vibrates substantially in a circumferential direction of the rotor in the region of the blade tip 18. In this regard, it is pointed out that, in general, in the case of the blade of FIGS. 7 to 9, the lower region adjacent to the blade root 2 up to the radial height of the axially rearmost point 121 substantially does not vibrate. By contrast, it is primarily the upper region, adjoining said lower region, of the blade airfoil 1 that experiences vibration. By means of the variation of the profile chord length at the trailing edge, too, this vibration can be influenced in a favorable manner.

It will be understood that the invention is not limited to the above-described embodiments and various modifications and improvements can be made without departing from the concepts described herein. It is furthermore pointed out that any of the features described can be used separately or in combination with any other features, to the extent that said features are not mutually exclusive. The disclosure also extends to and comprises all combinations and sub-combinations of one or a plurality of features which are described here. If ranges are defined, said ranges thus comprise all of the values within said ranges as well as all of the partial ranges that lie in a range.

The invention claimed is:

1. A rotor blade airfoil of a turbomachine, comprising:
a leading edge;
a trailing edge;
a profile chord, wherein the profile chord is a connecting line between the leading edge and the trailing edge;
a profile chord length which is a measurement of the profile chord, wherein the profile chord length is dependent on a height of the rotor blade airfoil;
a radial extent which defines a radial direction of the rotor blade airfoil;
an axial direction which runs perpendicular to the radial direction and which is directed in a direction of the trailing edge;
a radially lowermost profile chord section, wherein the axial direction of the rotor blade airfoil is defined by the profile chord in the radially lowermost profile chord section, and wherein the radially lowermost profile chord section comprises a point of the leading edge and a point of the trailing edge of the rotor blade airfoil at a particular radial height of the blade airfoil;
an axially foremost point of the leading edge and an axially rearmost point of the trailing edge in a side view of the rotor blade airfoil, which includes an orthogonal projection of the rotor blade airfoil in a plane which is spanned by the axial direction and the radial direction;
a maximum projected chord length comprising an axial spacing between the axially foremost point of the leading edge and the axially rearmost point of the trailing edge of the rotor blade airfoil in the side view;
a rotor blade root including a front root point at a region of the leading edge and a rear root point at a region of the trailing edge, wherein the rotor blade root extending from at least one chosen from the front root point and the rear root point over 5% of the radial height at a corresponding at least one chosen from the leading edge and the trailing edge is not taken into consideration in a determination of the axially foremost point of the leading edge and the axially rearmost point of the trailing edge;
a front axial region between the axially foremost point of the leading edge and an axially rearmost point of the leading edge, wherein in the side view an axial position of the leading edge varies in a manner dependent on a height of the rotor blade airfoil along the front axial region, and
a rear axial region between an axially foremost point of the trailing edge and the axially rearmost point of the trailing edge, wherein with respect to the side view, the axial position of the trailing edge of the rotor blade airfoil varies in a manner dependent on a height of the blade airfoil along the rear axial region, and wherein a variation of the axial position of the trailing edge in the rear axial region amounts to at least 10% of a maximum projected chord length;
wherein, with respect to the side view, the trailing edge of the rotor blade airfoil assumes the axially rearmost point at a height of the rotor blade airfoil that is between 20% and 50% of a total height of the rotor blade airfoil at the trailing edge, and wherein the leading edge of the rotor blade airfoil assumes the axially foremost point at a height of the rotor blade airfoil that is between 15% and 35% of a total height of the rotor blade airfoil at the leading edge.

2. The rotor blade airfoil according to claim 1, wherein the variation of the axial position of the trailing edge in the rear axial region is between 20% and 35% of the maximum projected chord length.

3. The rotor blade airfoil according to claim 2, wherein the variation of the axial position of the trailing edge in the rear axial region is between 23% and 27% of the maximum projected chord length.

4. The rotor blade airfoil according to claim 1, wherein the variation of the axial position of the leading edge in the front axial region is between 20% and 35% of the maximum projected chord length.

5. The rotor blade airfoil according to claim 4, wherein the variation of the axial position of the leading edge in the front axial region is between 23% and 27% of the maximum projected chord length.

6. The rotor blade airfoil according to claim 1, wherein the variation of the axial position of the leading edge in the front axial region and the variation of the axial position of the trailing edge in the rear axial region are one chosen from identical and differing by at most 10% with respect to the variation of the axial position of the leading edge in the front axial region.

7. The rotor blade airfoil according to claim 1, wherein the profile chord length at a blade tip of the rotor blade airfoil is between 30% and 70% of the maximum projected chord length.

8. The rotor blade airfoil according to claim 7, wherein the profile chord length at the blade tip of the rotor blade airfoil is between 45% and 55% of the maximum projected chord length.

9. The rotor blade airfoil according to claim 1, wherein the trailing edge of the blade airfoil assumes the axially rearmost point at a height of the blade airfoil that is between 33% and 37% of the total height of the blade airfoil at the trailing edge.

10. The rotor blade airfoil according to claim 1, wherein the leading edge of the blade airfoil assumes the axially foremost point at a height of the blade airfoil that is between 18% and 24% of the total height of the blade airfoil at the leading edge.

11. The rotor blade airfoil according to claim 1, wherein a maximum profile chord length of the blade airfoil is realized at a height of the blade airfoil that is between 15% and 65% of the total height of the blade airfoil at the leading edge.

12. The rotor blade airfoil according to claim 11, wherein the maximum profile chord length of the blade airfoil is realized at a height of the blade airfoil that is between 50% and 60% of the total height of the blade airfoil at the leading edge.

13. The rotor blade airfoil according to claim 1, wherein the trailing edge line of the blade airfoil in the side view under consideration includes an inflection point.

14. The rotor blade airfoil according to claim 13, wherein the trailing edge line of the blade airfoil has two inflection points and two or three extreme values of the axial position.

15. The rotor blade airfoil according to claim 13, wherein the trailing edge line of the blade airfoil has three inflection points and four extreme values of the axial position.

16. The rotor blade airfoil according to claim 13, wherein the trailing edge line of the blade airfoil is, adjacent to a blade root, initially recessed inward in the direction of the leading edge and is, after an inflection point, bulged outward toward the rear.

17. The rotor blade airfoil according to claim 1, wherein the blade airfoil is configured such that, in a vibration mode, the blade airfoil vibrates in a circumferential direction at a blade tip.

18. A rotor blade airfoil of a turbomachine, comprising:
a leading edge;
a trailing edge;
a profile chord, wherein the profile chord is a connecting line between the leading edge and the trailing edge;
a profile chord length which is a measurement of the profile chord, wherein the profile chord length is dependent on a height of the rotor blade airfoil;
a radial extent which defines a radial direction of the rotor blade airfoil;
an axial direction which runs perpendicular to the radial direction and which is directed in a direction of the trailing edge;
a radially lowermost profile chord section, wherein the axial direction of the rotor blade airfoil is defined by the profile chord in the radially lowermost profile chord section and wherein the radially lowermost profile chord section comprises a point of the leading edge and a point of the trailing edge of the rotor blade airfoil at a particular radial height of the blade airfoil;
an axially foremost point of the leading edge and an axially rearmost point of the trailing edge in a side view of the rotor blade airfoil, which includes an orthogonal projection of the rotor blade airfoil in a plane which is spanned by the axial direction and the radial direction;
a maximum projected chord length comprising the axial spacing between the axially foremost point of the leading edge and the axially rearmost point of the trailing edge of the rotor blade airfoil in the side view;
a rotor blade root including a front root point at a region of the leading edge and a rear root point at a region of the trailing edge, wherein the rotor blade root extending from at least one chosen from the front root point and the rear root point over 5% of the radial height at a corresponding at least one chosen from the leading edge and the trailing edge is not taken into consideration in a determination of the axially foremost point of the leading edge and the axially rearmost point of the trailing edge;
a front axial region between the axially foremost point of the leading edge and an axially rearmost point of the leading edge, wherein in the side view, an axial position of the leading edge varies in a manner dependent on a height of the rotor blade airfoil along the front axial region;
a rear axial region between an axially foremost point of the trailing edge and the axially rearmost point of the trailing edge, wherein with respect to the side view, the axial position of the trailing edge of the rotor blade airfoil varies in a manner dependent on a height of the blade airfoil along the rear axial region;
wherein a variation of the axial position of the trailing edge in the rear axial region is between 23% and 27% of a maximum projected chord length;
wherein a variation of the axial position of the leading edge in the front axial region is between 23% and 27% of the maximum projected chord length;

wherein the trailing edge of the rotor blade airfoil assumes the axially rearmost point at a height of the rotor blade airfoil that is between 33% and 37% of a total height of the blade airfoil at the trailing edge;

wherein the leading edge of the rotor blade airfoil assumes the axially foremost point at a height of the rotor blade airfoil that is between 18% and 24% of a total height of the rotor blade airfoil at the leading edge; and wherein a maximum profile chord length of the rotor blade airfoil is realized at a height of the rotor blade airfoil that is between 50% and 60% of the total height of the rotor blade airfoil at the leading edge.

19. A rotor of a compressor stage of a turbomachine comprising a plurality of rotor blade airfoils according to claim 1.

20. The rotor according to claim 19, wherein the rotor is a fan of integrated construction.

\* \* \* \* \*